Oct. 21, 1930.  W. D. GRIPP  1,779,038
POWER DELIVERING APPARATUS FOR AUTOMOBILES
Filed March 16, 1926
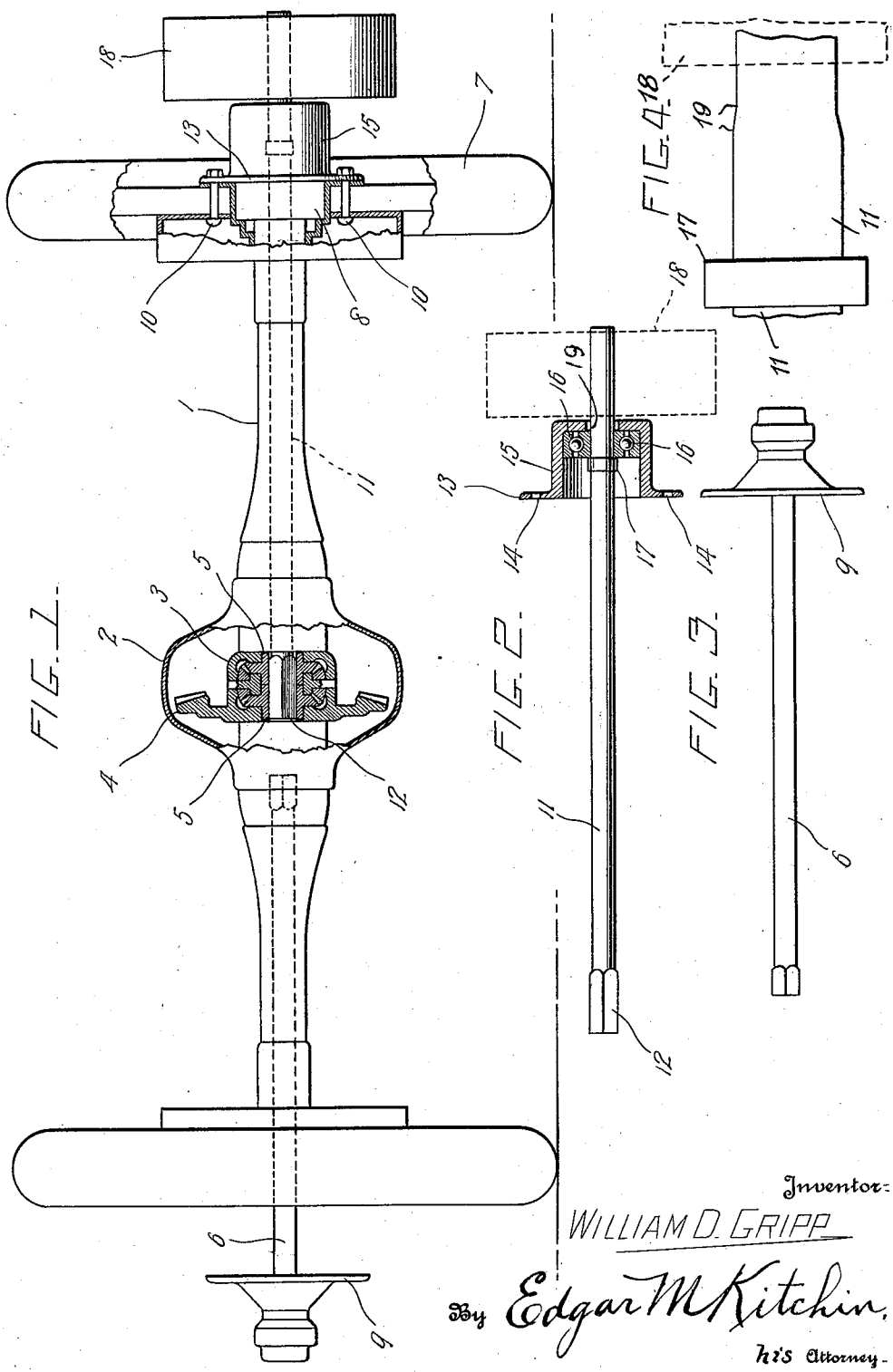
Inventor:
WILLIAM D. GRIPP
By Edgar M. Kitchin,
his Attorney Patented Oct. 21, 1930

1,779,038

UNITED STATES PATENT OFFICE

WILLIAM D. GRIPP, OF BRIDGEPORT, CONNECTICUT

POWER-DELIVERING APPARATUS FOR AUTOMOBILES

Application filed March 16, 1926. Serial No. 95,081.

This invention relates to improvements in power transmission and delivery apparatus, and more particularly to the type utilizing automobile enginery as the source of energy. The object in view is the effective delivery of power for general uses from an automobile with the least possible alteration in the original construction of the automobile.

With this and further objects in view as will in part hereinafter become apparent and in part be stated, the invention comprehends a structure adapted for application to an automobile of the full floating axle type with ease and facility, and without the necessity for auxiliary or exterior parts.

The invention comprises certain other novel constructions, combinations and arrangements of parts as subsequently specified and claimed.

In the accompanying drawings,—

Figure 1 is a view in side elevation of the rear portion of an automobile having the invention applied thereto, parts being broken away for disclosing interior structure.

Figure 2 is a view in side elevation of the power shaft detached, the bearing and anchoring flange and housing being seen in section.

Figure 3 is a view in side elevation of a section of a live axle detached.

Figure 4 is a view in side elevation of the outer end portion of the power shaft, detached, seen on a greatly enlarged scale, and the reducing shoulder considerably exaggerated for purposes of ready disclosure.

Referring to the drawings by numerals, 1 indicates the usual tubular or dead rear axle of any ordinary automobile of the full floating axle type. The two sections of the dead axle 1 are connected by the differential housing 2 in the usual manner, and within the housing is arranged the differential gearing 3 carrying the ring gear 4. The differential gearing 3 is of the conventional type and is provided with a pair of internally polysided sleeves 5, 5, to receive the correspondingly shaped portion of the live axles 6. The outer end of each live axle or live axle section 6 extends through and beyond its respective carrier wheel 7 in the usual manner. Each of said carrier wheels is ordinarily journaled on the outer end portion of the respective section of the dead axle 1, and is provided with appropriate bearings 8 for forming the anti-friction support between the wheel 7 and axle. Each of the wheels 7 is locked to the axle 1 against lateral displacement in the usual manner, and the live axle 6 is, therefore, entirely independent of the weight stresses or load on the vehicle, so that it is commonly called "floating". The extended portion of each axle section 6 is splined or otherwise appropriately detachably fixed to a flange 9 which is bolted, at 10, 10, to the hub of the wheel 7. Power is delivered from the differential through the live axles 6, flanges 9, and bolts 10 to the carrier wheels 7, which are thus also driving wheels.

All of the parts thus far described are common, well known and in general use, and have been referred to merely to facilitate a ready understanding of the invention now to be set forth in detail. A shaft 11 is provided identical in form with either of the axle sections 6, except that the shaft 11 is sufficiently longer than an axle section to extend beyond the hub of wheel 7 when substituted for one of the axle sections. The inner end portion of the shaft 11 is made polysided, as at 12, corresponding to the polysided portion of the axle section 6 but of greater length than the polysided portion of said axle 6, so that the polysided portion 12 of shaft 11 is amply long to extend through both of the sleeves 5. In applying the shaft 11, the nuts of bolts 10 of both of the driving wheels of the automobile are removed, and the section 6 of the off driving wheel is withdrawn a few inches to leave its respective sleeve 5 clear. The other section 6 is withdrawn completely, and the flange 9 is left connected to the withdrawn section. The shaft 11 is then introduced longitudinally through the dead axle 1 until the polysided portion 12 enters the first sleeve 5. The shaft 11 is then thrust further inward until the polysided portion 12 passes into and throughout the length of the second sleeve 5, so that the two sleeves are locked together against independent movement. This condition temporarily destroys any possibility of the differential gear functioning as such, and the ring gear 4 thereupon becomes merely the equivalent of a beveled gear rigidly connected to drive the shaft 11. The outer portion of shaft 11 extending through and beyond the portion of the dead axle 1 within the hub of the wheel 7 is then supplied with a flange 13 designed to take the place of the regular flange 9. The flange 13 is provided with apertures 14 adapted to receive the bolts 10 for anchoring the flange to the hub of wheel 7 in the same manner as the flange 9 was formerly anchored thereto. The flange 13 carries a bearing housing 15 in which is arranged an appropriate anti-friction bearing 16 preferably of the ball or roller type, or of any other appropriate and well known type. To facilitate assemblage, the outer portion of the shaft 11 is preferably slightly reduced in diameter from the point indicated at 19 in Figure 2 to the outer end of the shaft. Spaced inward from the point 19, shaft 11 is provided with an annular shoulder which may be produced in any of various ways, such as by the securing of a collar 17 or the formation of an integral shoulder on the shaft. The shoulder thus formed is spaced from the point 19 along the shaft 11 a distance equal approximately to the width of the inner raceway of bearing 16, and the diameter of the shaft for this particular space is preferably substantially equal to the diameter of the bore of the inner raceway of bearing 16. Thus, incident to the reduced diameter of the outer portion of the shaft (which reduction is so slight as not to appear in the drawing) the bearing 16 may, when the parts are being assembled, be slipped readily onto the shaft 11 from the outer end thereof until it reaches the point 19. It must thereupon be forced further onto the shaft until it contacts with the shoulder formed by the collar or enlargement 17. Thus the bearing has a driven fit on the shaft and it is also preferable to provide for a similar driven fit of the outer raceway of the bearing in the bearing housing 15. As the bearing 16 is commercially usually supplied in the form of a unit, the assemblage of the parts will ordinarily include easily moving the housing 15 over the bearing 16 to the beginning of the driving fit, and thereafter the housing is preferably driven up to the position seen in Figure 2. The raceways of the bearing 16 are, therefore, connected with a driving fit and will retain their position during use without further anchorage. This assemblage of the flange 13 and housing 15 with the bearing 16 on the shaft 11 is preferably accomplished in the machine shop or factory where the structure is being built, so that all the operator has to do, when applying the invention to his automobile, is to remove the nuts of bolts 10, withdraw one of the axle sections 6 entirely, and partially withdraw the other axle, and then introduce the polysided end of shaft 11 and through the shaft inward until he can apply the bolts 10 through the apertures 14 and thus anchor the flange 13 in place in substitution for flange 9. This being accomplished, the automobile is ready for the delivery of power for any working purposes. The outer end portion of shaft 11 extending beyond the bearing 16 and housing 15 may be already provided with a power delivering drum or pulley 18, or the pulley 18 may be splined removably on the extended end of the shaft 11 and assembled after the shaft has been connected to the source of power as just described.

When the parts are assembled as just stated for the delivery of power, it will be noted that the pulley 18 may be provided with a belt or other power delivering means without the need for any supplemental support for the exposed end of shaft 11 and without the necessity for even so much as leveling up the driving wheels of the automobile. The bearings of the differential gear serve as a bearing for the inner end of the shaft 11, and the bearing 16 is the bearing for the outer end, so that the shaft is ready for use as soon as introduced and the nuts of bolts 10 tightened against the flange 13.

When the present improved power delivering mechanism is applied, the automobile is appropriately retained against bodily movement, and for this purpose the application of the emergency brakes will be found sufficient.

It will be observed that the housing 15 through the anchorage of flange 13 prevents outward movement of the bearing 16 and the bearing in turn engaging the shoulder of sleeve 17 prevents outward play of shaft 11, and that the shaft is prevented from inward play by its engagement with the sleeves 5. The shaft 11 is thus held against any appreciable axial thrust. It is well understood, of course, that the polysided inner end of a live axle is so shaped that the rounded shoulders of the cylindrical portion outstand sufficiently beyond the flat faces to present stops against excess inward movement of the axle. This is true of the shaft 11 which is thus prevented from moving into the sleeves 5 further than shown in Figure 1 of the drawings.

What is claimed is:—

1. A power delivery attachment for automobiles comprising a shaft substantially of the form and dimensions of one-half of a live axle of an automobile and sufficiently longer than such half and properly proportioned to extend across and engage both sides of the differential at one end portion and to extend beyond the wheel of the automobile at the other end portion, a flanged housing at the outer end portion of said shaft in which said shaft is journaled, and power delivery means engaging the shaft beyond said housing, the said housing and its flange being the sole support of the outer portion of the shaft and being proportioned and shaped to be interchangeable with the regular hub flange of the rear wheel of an automobile.

2. An attachment as claimed in claim 1 in combination with means at the outer portion of and carried by the shaft for limiting outward end thrust.

In testimony whereof I affix my signature.

WILLIAM D. GRIPP.